United States Patent
Zhuge et al.

(10) Patent No.: US 9,462,083 B1
(45) Date of Patent: Oct. 4, 2016

(54) SERVER SIDE MATCHING OF OFFSITE CONTENT VIEWING TO ONSITE WEB ANALYTICS DATA

(71) Applicant: Google Inc., Mountain View, CA (US)

(72) Inventors: Yuan Zhuge, Mountain View, CA (US); Xiuduan Fang, Santa Clara, CA (US); Niranjan Heddese Sitaram Shastry, Sunnyvale, CA (US); Nagaraju Pothineni, Milpitas, CA (US); Sagnik Nandy, Los Gatos, CA (US); Jesse Savage, Redwood City, CA (US); Sissie Hsiao, Los Altos, CA (US); Chao Cai, San Jose, CA (US)

(73) Assignee: Google Inc., Mountain View, CA (US)

(*) Notice: Subject to any disclaimer, the term of this patent is extended or adjusted under 35 U.S.C. 154(b) by 630 days.

(21) Appl. No.: 13/833,459

(22) Filed: Mar. 15, 2013

(51) Int. Cl.
H04L 29/06 (2006.01)

(52) U.S. Cl.
CPC .................... H04L 67/42 (2013.01)

(58) Field of Classification Search
CPC .. G06Q 30/02; G06Q 30/0255; G06Q 30/00; H04L 67/02; H04L 67/20; G06F 17/30; G06F 7/06; G07G 1/14
See application file for complete search history.

(56) References Cited

U.S. PATENT DOCUMENTS

| | | | | |
|---|---|---|---|---|
| 7,647,299 B2* | 1/2010 | Harik | ............... | G06F 17/30864 707/999.003 |
| 8,060,402 B1* | 11/2011 | Ranganath | ............. | G06Q 30/02 705/14.73 |
| 8,368,698 B2* | 2/2013 | Gao | ................. | G06F 17/30864 345/440 |
| 8,620,748 B1* | 12/2013 | Ruarte | ................... | G06Q 30/02 705/14.41 |
| 8,843,514 B1* | 9/2014 | Moonka | ............ | G06F 17/30861 707/758 |
| 2007/0005606 A1* | 1/2007 | Ganesan | .......... | G06F 17/30864 |
| 2008/0046562 A1 | 2/2008 | Butler | | |
| 2008/0133754 A1* | 6/2008 | Smyth | ............... | G06F 17/30905 709/226 |
| 2008/0183858 A1 | 7/2008 | Error | | |
| 2009/0176560 A1 | 7/2009 | Herrmann et al. | | |
| 2009/0248494 A1 | 10/2009 | Hueter et al. | | |
| 2009/0327070 A1* | 12/2009 | Etchegoyen | ...... | G06F 17/30867 705/14.45 |
| 2011/0040623 A1* | 2/2011 | Lauwers | ................ | G06Q 30/02 705/14.53 |
| 2011/0078321 A1* | 3/2011 | Muret | ..................... | H04L 67/22 709/228 |
| 2013/0080259 A1* | 3/2013 | Durvasula | .......... | G06Q 30/0246 705/14.66 |
| 2013/0110944 A1* | 5/2013 | Ketcham | ........... | G06F 17/30864 709/206 |
| 2014/0100944 A1* | 4/2014 | Zhu | .................... | G06Q 30/0275 705/14.41 |

* cited by examiner

Primary Examiner — Ario Etienne
Assistant Examiner — Kidest Mendaye
(74) Attorney, Agent, or Firm — Foley & Lardner LLP; John D. Lanza (57) ABSTRACT

The present disclosure is directed generally to systems and methods for the server side matching of web analytics and content viewing. According to the methods and systems disclosed herein, a first identifier is delivered to a client device when the client device accesses a first website. If the client device later accesses of a second website the first identifier can be processed by the system to determine if the client device previously accessed the first website.

19 Claims, 4 Drawing Sheets

SERVER SIDE MATCHING OF OFFSITE CONTENT VIEWING TO ONSITE WEB ANALYTICS DATA

BACKGROUND OF THE DISCLOSURE

Websites often include analytics engines that monitor site traffic. Additionally, supplemental content it often displayed on websites. The supplemental content can direct traffic from a first website to a second website. If a user views supplemental content form a second website on a first website, but visits the second website without clicking on the link within the supplemental content, the second website's analytics engine is unaware the supplemental content was effective in driving traffic to the second website.

BRIEF SUMMARY OF THE DISCLOSURE

According to one aspect of the disclosure a method for matching content viewing with data analytics includes receiving a first data packet responsive to the viewing, by a first computing device, of a content item on a first web page and storing the first data packet in association with a content item identifier in a first database. The method may also include receiving a second data packet responsive to the first computing device accessing a second web page and storing the second data packet in association an identification of with the second web page in a second database. The method may also include determining, responsive to an identification of a shared unique identifier between the first and second data packet, that the first computing device viewed the first web page prior to viewing the second web page, and then matching a page visit of the second web page by the first computing device to the viewing of the content item by the first computing device.

In some implementations, the first data packet includes a first cookie ID and the second data packet includes a second cookie ID. In some of these implementations, the first data packet is further stored in association with at least one of a campaign, an advertiser name, a content type, and a content item name.

In other implementations, the method also includes receiving a third data packet responsive to the viewing, by a third computing device, of a second content item, on a third web page and determining if the third data packet shares a unique identifier with the second data packet. In certain implementations, the method further includes matching a second page visit of the second website by the first computing device to the viewing of a second content item by the first computing device.

In certain implementations, the method includes calculating an effective measure of the content item by determining if the first database contains an additional data packet with the same unique identifier as the second data packet. In yet other implementations, an effective measure of a campaign or a content type associated with the content item is calculated.

According to another aspect of the disclosure, a system for matching content viewing with data analytics includes one or more processors and a computer-readable storage medium storing instructions that when executed by the one or more processors cause the one or more processors to perform operations. The operations can include receiving a first data packet responsive to the viewing, by a first computing device, of a content item on a first web page, and storing the first data packet in association with a content item identifier in a first database. The operations can also include receiving a second data packet responsive to the first computing device accessing a second web page, and storing the second data packet in association an identification of with the second web page in a second database. The operations can further include determining, responsive to an identification of a shared unique identifier between the first and second data packet, that the first computing device viewed the first web page prior to viewing the second web page; and matching a page visit of the second web page by the first computing device to the viewing of the content item by the first computing device.

In some implementations, the first data packet comprises a first cookie ID and the second data packet comprises a second cookie ID. In yet other implementations, the instructions further cause the one or more processors to perform the operation of storing the first data packet in association with at least one of a campaign, an advertiser name, a content type, and a content item name. In other implementations, the instructions further cause the one or more processors to perform the operation of receiving a third data packet responsive to the viewing, by a third computing device, of a second content item, on a third web page.

In certain implementations, the instructions further cause the one or more processors to perform the operation of determining if the third data packet shares a unique identifier with the second data packet, and perform the operation of matching a second page visit of the second website by the first computing device to the viewing of a second content item by the first computing device.

In yet other implementations, the instructions further cause the one or more processors to perform the operation of calculating an effective measure of the content item, wherein the effective measure further includes determining if the first database contains an additional data packet with the same unique identifier as the second data packet. In some implementations, the instructions further cause the one or more processors to perform the operation of calculating an effective measure of a campaign or a content type associated with the content item.

According to another aspect of the disclosure, a computer readable medium having instructions stored thereon, which when executed by at least one processing circuit, cause the at least one processing circuit to match content viewing with data analytics. The computer readable medium includes instructions to receive a first data packet responsive to the viewing, by a first computing device, of a content item on a first web page, and store the first data packet in association with a content item identifier in a first database. The computer readable medium also includes instructions to receive a second data packet responsive to the first computing device accessing a second web page, and store the second data packet in association an identification of with the second web page in a second database. The computer readable medium further includes instructions to determine, responsive to an identification of a shared unique identifier between the first and second data packet, that the first computing device viewed the first web page prior to viewing the second web page; and match a page visit of the second web page by the first computing device to the viewing of the content item by the first computing device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The present disclosure is directed generally to systems and methods for the server side matching of web analytics and content viewing. According to the methods and systems disclosed herein, a first identifier is delivered to a client device when the client device accesses a first website. If the client device later accesses a second website the first identifier can be processed by the system to determine if the client device previously accessed the first website.

Figure 1:
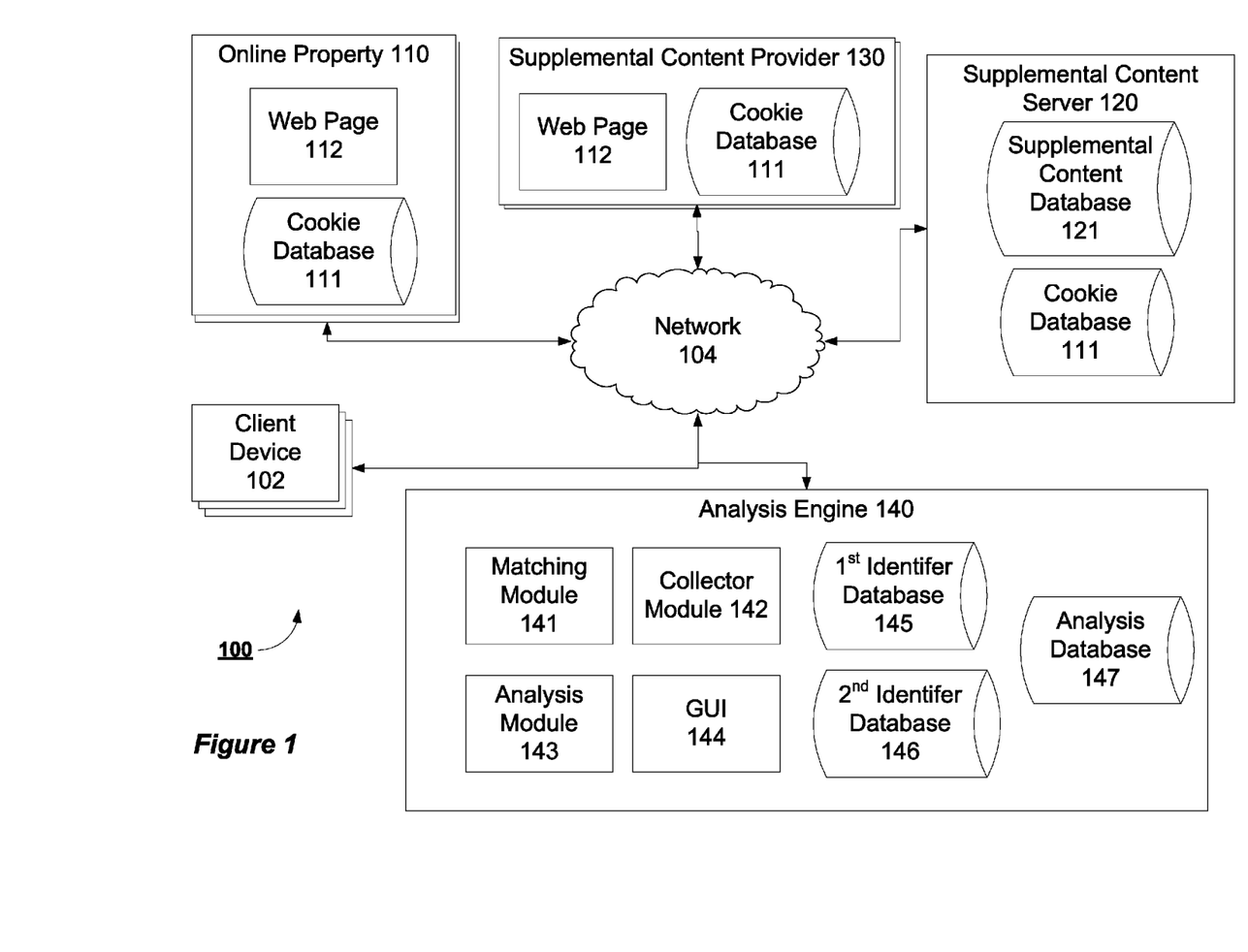
FIG. 1 is block diagram of an example system for matching content viewing with data analytics; in accordance with an implementation of the present disclosure.

FIG. 1 is a block diagram of an example system 100 for server side matching of web analytics and supplemental content item viewing. The system 100 includes a plurality of online property servers 110. The plurality of online property servers 110 provide at least one web page 112 to at least one client device 102 and can also include a cookie database 111. The system 100 also includes a supplemental content server 120, which includes a supplemental content database 121 and a cookie database 111. The supplemental content server 120 can provide supplemental content to client devices 102 responsive to the client device's 120 request when rendering a web page 112. The supplemental content publisher server 130 provides at least one web page 112 to a client device 102 and also includes a cookie database 111. The supplemental content publisher server 130 provides the supplemental content server 120 with supplemental content for distribution. The system 100 includes an analytics engine 140. The analytics engine 140 includes a plurality of sub-components, which inducing a matching module 141, a collector module 142, an analysis module 143, graphical user interface module 144, a first identifier database 145 and a second identifier database 146, and an analysis database 147. As illustrated in system 100, the various nodes of system 100 communicate with one another via the network 104.

Referring to system 100 in greater detail, the online property servers 110 and supplemental content publisher servers 130 host web pages 112 that can be accessed and viewed by users over the network 104 via a program running on a client device 102. The program, such as a web browser, facilitates the sending and receiving of data between the client device 102 and online property server 110, supplemental content publisher server 130, and/or supplemental content server 120. The web pages 112 hosted by the online property servers 110 and supplemental content publisher servers 130 can include, but are not limited to, websites, social media sites, business outlets, or any other network accessible property.

A client device 102 can download a web page 112 from an online property server 110 and execute code contained within the web page 112 to render the web page 112. The rendered web page 112 can include content such as articles, documents, digital media, or any other network accessible content. Additionally, the rendered web pages 112 can include space for the display of supplemental content. The supplemental content can include, but is not limited to, supplemental information, links to related content, and advertisements.

The plurality of online property servers 110 also include a cookie database 111. In some implementations, when a web page 112 is accessed by a client device 102, the web page 112 includes code, which when executed, sets a HTTP cookie (also referred to simply as a cookie) on the client device 102. In some implementations, the cookie can be generated by the execution of the code and in some implementations the code causes the client device 102 to retrieve data that becomes or is incorporated into the cookie. In some implementations, the data of a cookie stored on a client device 102 can be read and/or amended by the other components of system 100. When a cookie and a web page 112 originate from the same source, the cookie can be referred to as a first-party cookie. In contrast, a third-party cookie is a cookie that is delivered to a client device 102 from a source that did not provide the web page 112. For example, a third-party cookie can be generated when an online property server 110 web page 112 contains a script that when executed sets a cookie from the supplemental content server 120. While the cookie databases 111 of the various components of system 100 are illustrated as a sub-component of each respective component, in some implementations, the cookie database 111 can be maintained on a third party server, such as on the server of a web page analytics system.

In certain implementations, a supplemental content publisher server 130 drives traffic to its own web pages 112 with the placement of supplemental content on the web pages 112 of the online property servers 110. For example, the supplemental content publisher server 130 can provide a supplemental content item to a supplemental content server 120 which distributes the supplemental content item to a client device 102 when the client device 102 accesses the online property publisher's web page 112. The supplemental content item may contain a link that when clicked, causes the client device 102 to access a web page 112 of the supplemental content publisher server 130.

As described above, the supplemental content publisher server 130 can provide supplemental content to a supplemental content server 120, which in turn distributes the supplemental content to a client device 102 via a web page 112 when requested. In certain implementations, the supplemental content server 120 can be an ad server.

In some implementations, the supplemental content server 120 may provide the online property server 110 with code, that when executed by a client device 102, sends a request to the supplemental content server 120 for a supplemental content item. The program for viewing the web page 112 on the client device 102 then renders the supplemental content item into the rendered web page 112. As illustrated, the supplemental content server 120 also includes a cookie database 111. In some implementations, the cookie database 111 of the supplemental content server 120 can be referred to as a third-party cookie database. It may be referred to as a third party cookie database 111 because in some implementations the supplemental content server 120 sets a cookie on the client device 102 when the code being executed on the client device 102 requests a supplemental content item. In certain implementations, the code provided by the supplemental content server 120 also transmits back anonymous information to the supplemental content server 120. In some implementations, the transmitted data and/or the cookie can be used to ensure the same supplemental content item is not delivered to a client device 102 multiple times. In some implementations, the transmitted data can be data from cookies previously delivered to the client device 102 by the supplemental content server 120.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The system 100 also includes an analytics engine 140. As illustrated, the analytics engine 140 is a stand alone component that communicates with the other components of the system 100 via the network 104. In other implementations, the analytics engine 140 can be a component of the supplemental content server 120 or the above-referenced third-party analytics system.

In order to match the previous viewing of supplemental content with access to a supplemental content publisher server's web page 112, the collector module 142 of the analytics engine 140 can retrieve anonymous data from the cookie database 111 of the online property publisher, the supplemental content server, and/or the supplemental content publisher server in order to link the site visit of a web page 112 to the viewing of supplemental content on another web page. For example, a user may view supplemental content for a music website on a news site, but does not click on the supplemental content. Rather, at a later date, the user visits the music website by directly entering the music website's URL into a web browser executing on user's client device 102. In this example, by analyzing the retrieved cookies from the various servers of system 100, the analytics engine 140 can match the visit to the music website with the previously-viewed supplemental content on the news website.

In some implementations, cookies retrieved from the cookie database 111 of the supplemental content server 120 or online property sever 110 are referred to as first identifiers and the cookies retrieved from the cookie database 111 of the supplemental content publisher server 130 are referred to as second identifiers. In some implementations, the collector module 142 stores the retrieved first identifier cookie data in the first identifier database 145 and stores the retrieved second identifier cookie in the second identifier database 146. In other implementations, the first and second identifiers are stored into a unified cookie database of the analytics engine 140.

The analytics engine 140 also includes a matching module 141. Discussed further in relation to the method 200 of FIG. 2, but briefly, the matching module 141 matches the second identifiers to first identifiers. Responsive to this step, the analytics engine 140 can determine if the viewing of a supplemental content item later resulted in a page visit.

In some implementations, the analytics engine 140 includes an analysis module 142. The analysis module 142 is used to provide a supplemental content publisher server 130 with information regarding the effectiveness of supplemental content. Discussed further in relation to method 300 of FIG. 3, but briefly, the analysis module 142 may show a supplemental content publisher server 130 the percentage of supplemental content views that translate into website traffic for the supplemental content publisher server 130. In certain implementations, a grouping of supplemental content items deployed by a supplemental content publisher server 130 is called a supplemental content campaign. The analytics engine 140 can store the analysis in the analysis database 147 for later retrieval and/or display.

The analytics engine 140 also includes a graphical user interface (GUI) 144. The GUI 144 can be used by the supplemental content publisher server 130 to view and/or request to view the above described analysis. Access to the GUI 144 may be secured using passwords, encryption, security keys, or other security measures. The GUI 144 may be a web page or the GUI of a mobile device or computer application.

Figure 2:
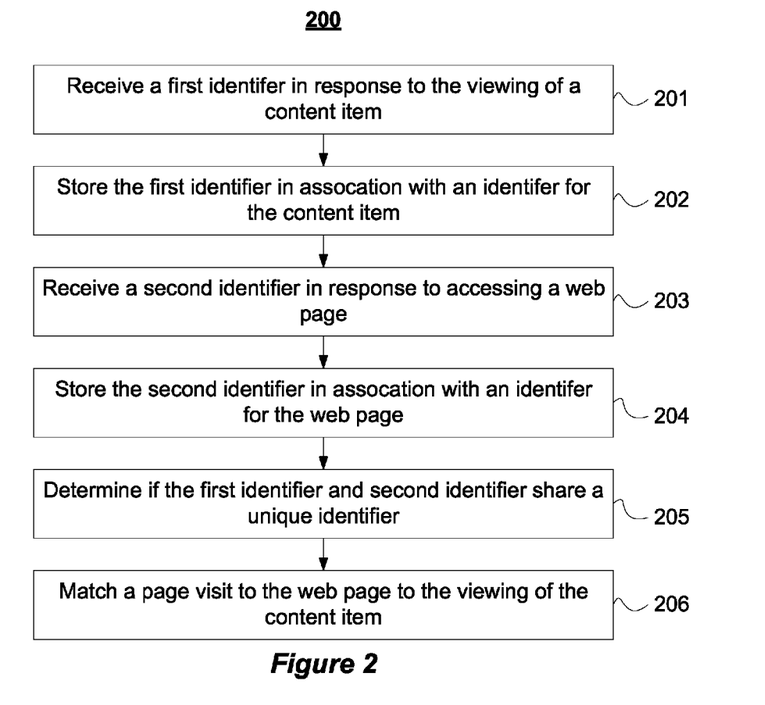
FIG. 2 is a flow diagram of an example method for matching the viewing of a content item with data analytics; in accordance with an implementation of the present disclosure.

FIG. 2 is a flow chart of an example method 200 for matching a page visit with the previous viewing of supplemental content using the system 100. The method 200 includes receiving a first identifier from a first device (step 201) and storing the first identifier in association with a content item (step 202). The method 200 also includes receiving a second identifier from a second computing device (step 203) and storing the second identifier in association with an online property. Responsive to receiving the first identifier and the second identifier, the system determines if the identifiers match (step 204). Next, the system matches the viewing of the content item to a page visit responsive to the determination of the identifiers match (step 206).

As set forth above, the method 200 begins with the receipt of a first identifier from a first computing device (step 201). In some implementations, the first identifier is data within a HTTP cookie. As described above, the cookie can be provided to a client device 102 when the client device 102 executes code from a web page 112, and similar code within a web page 112 can be used to retrieve data from a set HTTP cookie. For example, the first identifier can be set when the client device 102 executes code from a web page 112 that retrieves a supplemental content item. In some implementations, the collector module 142 of the analytics engine 140 retrieves the first identifiers at regular intervals. For example, the collector module 142 may collect the first identifiers once an hour, once a day, or once a week. In other implementations, the first identifier is transmitted to the analytics engine 140 immediately after being created Next, the method 200 stores the first identifier in association with a content item (step 202). As discussed above, the first identifier is set responsive to a client device 102 retrieving a supplemental content item. In some implementations, the supplemental content item that was delivered to the client device 102 also includes an identifier. In some implementations, the supplemental content identifier uniquely identifies the supplemental content item, the publisher of the supplemental content item, and/or the campaign to which the supplemental content item belongs. In some implementations, storing the first identifier in association with the supplemental content identifier allows for subsequent page visits to be matched to the viewing of a supplemental content item. For example, a user may view a website that includes an advertisement for a book. Upon the delivery of the advertisement to the client device 102, the supplemental content server 120 can provide the client device 102 with a random number that is stored in a HTTP cookie set on the client device 102. This random number can be transmitted to the analytics engine 140 as the first identifier. Additionally, in this example, the ad may be given a unique identifier by the supplemental content server 120, which can also be transmitted to the analytics engine 140. The analytics engine 140 may store additional information with the first identifier, such as the date and time the first identifier was created by the supplemental content server 120.

The method 200 also includes receiving a second identifier (step 203). In some implementations, the second identifier is a first-party cookie set when a client device 102 accesses a web page 112. In certain implementations, the second identifier is transmitted to the analytics engine 140 in association with an online property server identifier or a supplemental content publisher server identifier. In certain implementations, the second identifier can include additional data associated with the first identifier. For example, a client device 102 may access a website that sets a second identifier. In setting the second identifier, data from the first identifier may be retrieved from the client device 102. The code setting the second identifier may then communicate the details of a first identifier to the analytics engine 140 when reporting the second identifier. For example, a user may visit a website which contains supplemental content. When retrieving the supplemental content to display to the user, the code retrieving the supplemental content may set a first identifier. At a later date, the user may visit a second website, which is a website of the supplemental content publisher server that published the supplemental content previously viewed by the user. Code on the second website may set a second identifier, which also retrieves any first identifier stored on the client 102 that was set by supplemental content retrieval code provided to the first website by the supplemental content publisher server 130.

Responsive to receiving the second identifier, the method 200 includes storing the second identifier in association with the online property from which it originated (step 204). As discussed above, in some implementations, the website from which the second identifier is received is a website of the supplemental content publisher server 130. The second identifier is stored in association with the originating supplemental content publisher server 130, such that at subsequent steps, the origin of the second identifier can be referenced. In some implementations, the second identifier is also stored in association with details such as, but not limited to, the data the second identifier was created by the originating website, the time the second identifier was created by the originating website, and/or a first identifier.

The method 200 continues with the determination if the first and second identifiers match (step 205). In some implementations, after the collector module 142 has collected and stored the first and second identifiers, the matching module 141 cycles through the second identifiers in the second identifier database 146 to determine if there is a matching first identifier in the first identifier database 145. In some implementations, the matching module 141 can find a plurality of first identifiers that match to a single second identifier. For example, a client device 102 may access a plurality of websites each containing supplemental content from the same supplemental content publisher server 130. In this example, each visit to a website with the supplemental content publisher server's supplemental content will generate a first identifier. Upon visiting the web page 112 of the supplemental content publisher server 130, a second identifier is created, and because each of the first identifiers in this example were created by the same supplemental content publisher server 130, each first identifier can be determined to match the second identifier. In some implementations, the matches found by the matching module 141 are stored in the analysis database 147. In some implementations, the matching module repeats the matching process on a regular interval, such as every day, every week, or every month. In some implementations, the repeat of the matching process can include up to 90 days of page first identifier. For example, a user may visit a website A on day 1 and view an advertisement for website B, for which the user does not visit on day 1. Because the user did not visit website B on day 1, the matching module will not find a match for the first identifier generated from the viewing of website A on day 1. If, in this example, the user visits website B on day 4, the matching module will find a match for the first identifier generated on day 1 in the second identifier generated on day 4 responsive to visiting website B. In certain implementations, after matching a first identifier to a second identifier, the matching module can check at a later date to determine if a better and/or additional matches to the second identifier have been retrieved by the analysis engine 140.

The method 200 concludes with the matching of a page visit to the viewing of the supplemental content item (step 206). As discussed above, multiple first identifier matches can be found for a second identifier. In some implementations, the duplicate matches from step 205 are combined or deleted such that only one match is recorded for each second identifier. In some implementations, a second identifier is matched with the first identifier that was created in the most recent history. For example, and continuing the above example of visits to website A and website B, if the user, after visiting website B for the first time, returns to website A on day 5 and then visits website B a second time on day 6, the matching module may match the visit of website B on day 6 to the visit of website A on days 5 and 1 and match the visit of website B on day 4 to the visit of website A on day 1. During the matching step 206, the visit of website A on day 1 is matched to the page visit of website B on day 4 and the visit of website A on day 5 is matched to the visit of website B on day 6. In some implementations, the match of a page visit to the viewing of a content item is stored in the analysis database 147.

Figure 3:
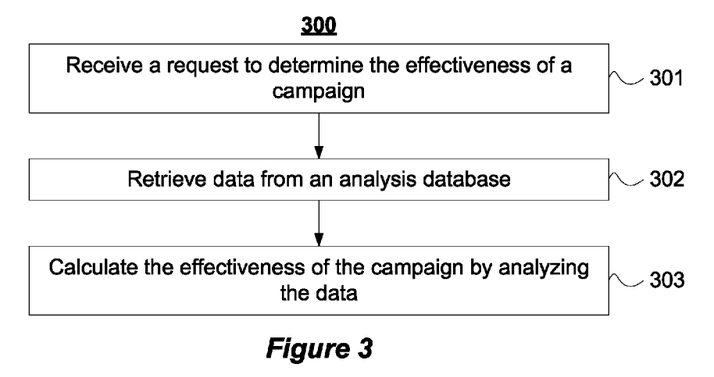
FIG. 3 is a flow diagram of an example method of determining the effectiveness of a supplemental content campaign; in accordance with an implementation of the present disclosure.

FIG. 3 is a flow chart of an example method 300 for analyzing the effectiveness of a supplemental content campaign. The method 300 beings with receiving a request to determine the effectiveness of a campaign (step 301). Responsive to the request data is retrieved from the analysis database (step 302). Having retrieved the data, the data is analyzed (step 303).

As set forth above, the method 300 of analyzing the effectiveness of a supplemental content campaign begins with the receipt of a request to determine the effectiveness of a campaign (step 301). The request can be atomically generated as part of a reporting system and/or the request can be initiated by the owner of an online property server 110 or supplemental content publisher server 130. In some implementations, the plurality of requests are continually generated and executed, such that the owner of the supplemental content publisher server 130 can log into the analytics engine 140 via the GUI 144 and view the effectiveness of the campaigns the supplemental content publisher server 130 is currently running.

The method 300 also includes retrieving data from the analysis database (step 302). As discussed above, the analysis database can contain all the pairings of first identifiers to second identifiers. In some implementations, the pairings have not yet been stored in the analysis database and the retrieval step 302 can include steps similar to the steps of method 200 to generate the data.

Responsive to retrieving the data, the effectiveness of the campaign is analyzed (step 303). When a supplemental content publisher server 130 has supplemental content placed on the web page 112 of an online property server 110, it is typically to drive traffic to the web pages 112 of the supplemental content publisher server 130. In some implementations, the effectiveness of the supplemental content is based on the rate of supplemental content click throughs vs. the rate of supplemental content view throughs. Clicking on a supplemental content item by a user of a client device 102 may take the user device 102 directly to the web page 112 of a supplemental content publisher server 130. This action is called a click through. A view through occurs when the user views, but does not click on, a supplemental content item and then travels to the supplemental content publisher server 130 at a later date. A supplemental content campaign may be determined effective when supplemental content items that convert to view through and click through is above a predetermined percent of the total supplemental content items displayed.

Similarly, in some implementations, the effectiveness of a supplemental content campaign can be determined by analyzing what faction of the displayed supplemental content items contribute to site traffic of the web pages 112 of the supplemental content publisher server 130. In this example, the above-described view throughs and click throughs are combined to create a single effectiveness metric. For example, a tennis shoe company may have 1 million ads displayed to a plurality of client devices 102 via a plurality web pages 112 of online property servers 110. If those 1 million ads result in 75,000 click throughs and 150,000 view throughs, the total effectiveness may be 22.5%, with a 15% view through rate and a 7.5% click through rate.

In another example, the effectiveness of a supplemental content campaign may be determined by how many times a supplemental content item is viewed before an action is taken by a user. In some implementations, this is calculated by comparing the number of first identifiers associated with a second identifier. For example, if for a specific campaign, the average ratio of first identifiers to second identifiers is 2 to 1, then on average, a user is shown 2 supplemental content items before the user visits the web page 112 of the supplemental content publisher server 130. A campaign with a ratio of 5 to 1 would be less effective because, on average, a user needs to be shown five supplemental content items before visiting the web page 112 of the supplemental content publisher server 130. In some implementations, the action can include accessing the webpage 112 of a supplemental content publisher server 130, purchasing a product, signing up for an account, and/or clicking on a link in a web page 112.

Figure 4:
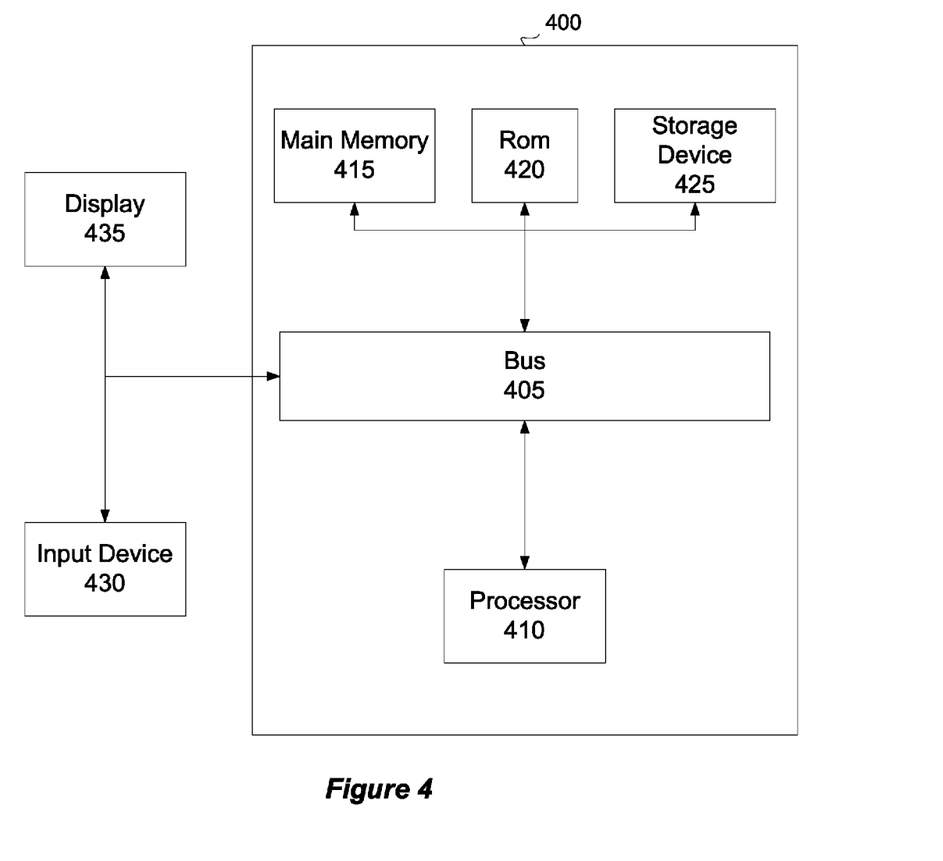
FIG. 4 is a block diagram illustrating a general architecture for a computer system that may be employed to implement various elements of the system shown in FIG. 1 and the methods shown in FIGS. 2 and 3; in accordance with an implementation of the present disclosure.

FIG. 4 is a block diagram of a computer system 400 in accordance with an illustrative implementation. The computer system or computing device 400 can be used to implement the system 100, client device 102, online property publisher 110, supplemental content publisher server 130, supplemental content server 120, and the analytics engine 140. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method for matching content viewing with data analytics for a content provider, the method comprising:
receiving a plurality of first data packets, each first data packet received responsive to a viewing, by a first computing device, of a content item on a first web page, the first web page provided by a third party different from the content provider, each first data packet including a content item identifier associated with the content item and first time data indicating a first time at which the content item was viewed;
storing the first data packets in a first database;
receiving a plurality of second data packets, each second data packet received responsive to the first computing device accessing a second web page provided by the content provider, each second data packet including a web page identifier associated with the second web page and second time data indicating a second time at which the second web page was accessed;
storing the second data packets in a second database;
for each of the second data packets:
determining whether there is a content item identifier of a first data packet in the first database matching a web page identifier of the second data packet;
responsive to determining there is the content item identifier of the first data packet in the first database matching the web page identifier of the second data packet, determining whether the first time of the first data packet is prior to the second time of the second data packet;
determining whether the second web page is accessed by clicking through the content item based on the first data packet and the second packet;
responsive to determining the first time is prior to the second time and the second web page is not accessed by clicking through the content item, determining that the content item was viewed within the first web page on the first computing device prior to accessing the second web page and matching the accessing of the second web page by the first computing device to the viewing of the content item on the first computing device without clicking though the content item; and
responsive to determining the first time is prior to the second time and the second web page is accessed by clicking through the content item, determining that the first computing device accessed the second web page after the content item was clicked through on the first web page;
determining an amount of times the second web page is accessed after viewing of the content item without clicking through the content item relative to a total amount of times the content item is displayed;
determining an amount of times the second web page is accessed after clicking through the content item relative to the total amount of times the content item is displayed; and
calculating an effectiveness measure of the content item, the effectiveness measure based on at least one of:
the amount of times the second web page is accessed after viewing of the content item relative to the total amount of times the content item is displayed;
the amount of times the second web page is accessed by clicking through the content item relative to the total amount of times the content item is displayed; or
an average number of times the content item is viewed before the second web page is accessed.

2. The method of claim 1, wherein each first data packet comprises a first cookie ID and each second data packet comprises a second cookie ID.

3. The method of claim 1, wherein each first data packet is further stored in association with at least one of a campaign, an advertiser name, a content type, and a content item name.

4. The method of claim 1, further comprising receiving a plurality of third data packets responsive to the viewing, by a third computing device, of a second content item, on a third web page.

5. The method of claim 4, further comprising determining if each third data packet shares a unique identifier with at least one of the second data packets.

6. The method of claim 5, further comprising matching a second page visit of the second website by the first computing device to the viewing of a second content item by the first computing device.

7. The method of claim 1, wherein calculating the effectiveness measure further comprises determining, for each second data packet, if the first database contains an additional data packet with an identifier that matches the web page identifier of the second data packet.

8. The method of claim 1, further comprising calculating an effectiveness measure of a campaign or a content type associated with the content item using the effectiveness measure of the content item.

9. The method of claim 1, wherein the content item is an advertisement.

10. A system for matching content viewing with data analytics, the system comprising:
one or more processors;
a computer-readable storage medium storing instructions that when executed by the one or more processors cause the one or more processors to perform operations comprising:
receiving a plurality of first data packets, each first data packet received responsive to a viewing, by a first computing device, of a content item on a first web page, the first web page provided by a third party different from the content provider, each first data packet including a content item identifier associated with the content item and first time data indicating a first time at which the content item was viewed;
storing the first data packets in a first database;
receiving a plurality of second data packets, each second data packet received responsive to the first computing device accessing a second web page provided by the content provider, each second data packet including a web page identifier associated with the second web page and second time data indicating a second time at which the second web page was accessed;
storing the second data packets in a second database;
for each of the second data packets:
determining whether there is a content item identifier of a first data packet in the first database matching a web page identifier of the second data packet;
responsive to determining there is the content item identifier of the first data packet in the first database matching the web page identifier of the second data packet, determining whether the first time of the first data packet is prior to the second time of the second data packet;

determining whether the second web page is accessed by clicking through the content item based on the first data packet and the second packet;

responsive to determining the first time is prior to the second time and the second web page is not accessed by clicking through the content item, determining that the content item was viewed within the first web page on the first computing device prior to accessing the second web page and matching the accessing of the second web page by the first computing device to the viewing of the content item on the first computing device without clicking though the content item; and responsive to determining the first time is prior to the second time and the second web page is accessed by clicking through the content item, determining that the first computing device accessed the second web page after the content item was clicked through on the first web page;

determining an amount of times the second web page is accessed after viewing of the content item without clicking through the content item relative to a total amount of times the content item is displayed;

determining an amount of times the second web page is accessed after clicking through the content item relative to the total amount of times the content item is displayed; and calculating an effectiveness measure of the content item, the effectiveness measure based on at least one of:
the amount of times the second web page is accessed after viewing of the content item relative to the total amount of times the content item is displayed;
the amount of times the second web page is accessed by clicking through the content item relative to the total amount of times the content item is displayed; or
an average number of times the content item is viewed before the second web page is accessed.

11. The system of claim 10, wherein each first data packet comprises a first cookie ID and each second data packet comprises a second cookie ID.

12. The system of claim 10, wherein the instructions further cause the one or more processors to perform the operation of storing each first data packet in association with at least one of a campaign, an advertiser name, a content type, and a content item name.

13. The system of claim 10, wherein the instructions further cause the one or more processors to perform the operation of receiving a plurality of third data packets responsive to the viewing, by a third computing device, of a second content item, on a third web page.

14. The system of claim 13, wherein the instructions further cause the one or more processors to perform the operation of determining if each third data packet shares a unique identifier with at least one of the second data packets.

15. The system of claim 14, wherein the instructions further cause the one or more processors to perform the operation of matching a second page visit of the second web site by the first computing device to the viewing of a second content item by the first computing device.

16. The system of claim 10, calculating the effectiveness effective measure further comprises determining, for each second data packet, if the first database contains an additional data packet with an identifier that matches the web page identifier of the second data packet.

17. The system of claim 10, wherein the instructions further cause the one or more processors to perform the operation of calculating an effectiveness measure of at least one a supplemental content campaign or a supplemental content type associated with the content item using the effectiveness measure of the content item.

18. The system of claim 10, wherein the content item is an advertisement.

19. A non-transitory computer readable medium having instructions stored thereon, which when executed by at least one processing circuit, cause the at least one processing circuit to:

receiving a plurality of first data packets, each first data packet received responsive to a viewing, by a first computing device, of a content item on a first web page, the first web page provided by a third party different from the content provider, each first data packet including a content item identifier associated with the content item and first time data indicating a first time at which the content item was viewed;

storing the first data packets in a first database;

receiving a plurality of second data packets, each second data packet received responsive to the first computing device accessing a second web page provided by the content provider, each second data packet including a web page identifier associated with the second web page and second time data indicating a second time at which the second web page was accessed;

storing the second data packets in a second database;

for each of the second data packets:
determining whether there is a content item identifier of a first data packet in the first database matching a web page identifier of the second data packet;

responsive to determining there is the content item identifier of the first data packet in the first database matching the web page identifier of the second data packet, determining whether the first time of the first data packet is prior to the second time of the second data packet;

determining whether the second web page is accessed by clicking through the content item based on the first data packet and the second packet;

responsive to determining the first time is prior to the second time and the second web page is not accessed by clicking through the content item, determining that the content item was viewed within the first web page on the first computing device prior to accessing the second web page and matching the accessing of the second web page by the first computing device to the viewing of the content item on the first computing device without clicking though the content item; and responsive to determining the first time is prior to the second time and the second web page is accessed by clicking through the content item, determining that the first computing device accessed the second web page after the content item was clicked through on the first web page;

determining an amount of times the second web page is accessed after viewing of the content item without clicking through the content item relative to a total amount of times the content item is displayed;

determining an amount of times the second web page is accessed after clicking through the content item relative to the total amount of times the content item is displayed; and calculating an effectiveness measure of the content item, the effectiveness measure based on at least one of:
   the amount of times the second web page is accessed after viewing of the content item relative to the total amount of times the content item is displayed;
   the amount of times the second web page is accessed by clicking through the content item relative to the total amount of times the content item is displayed; or
an average number of times the content item is viewed before the second web page is accessed.

* * * * *